(12) United States Patent
Tsuji

(10) Patent No.: US 8,230,173 B2
(45) Date of Patent: Jul. 24, 2012

(54) CACHE MEMORY SYSTEM, DATA PROCESSING APPARATUS, AND STORAGE APPARATUS

(75) Inventor: Masayuki Tsuji, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 347 days.

(21) Appl. No.: 12/402,114

(22) Filed: Mar. 11, 2009

(65) Prior Publication Data
US 2009/0235027 A1 Sep. 17, 2009

(30) Foreign Application Priority Data
Mar. 14, 2008 (JP) .................................. 2008-66067

(51) Int. Cl.
*G06F 12/00* (2006.01)
(52) U.S. Cl. .. 711/122; 711/117; 711/118; 711/E12.024
(58) Field of Classification Search .................. 711/117, 711/118, 122
See application file for complete search history.

(56) References Cited

U.S. PATENT DOCUMENTS
6,282,615 B1 * 8/2001 Arimilli et al. ............... 711/122
6,321,297 B1 * 11/2001 Shamanna et al. ............ 711/122
2006/0179252 A1 * 8/2006 Cantin et al. .................. 711/144

FOREIGN PATENT DOCUMENTS
| JP | 2552704 | 8/1996 |
| JP | 2637320 | 4/1997 |
| JP | 3055908 | 4/2000 |

* cited by examiner

*Primary Examiner* — Jared Rutz
*Assistant Examiner* — Aracelis Ruiz
(74) *Attorney, Agent, or Firm* — Staas & Halsey LLP

(57) ABSTRACT

A cache memory system includes a plurality of first storage hierarchical units provided individually to a plurality of processors. A second storage hierarchical unit is provided commonly to the plurality of processors. A control unit controls data transfer between the plurality of first storage hierarchical units and the second storage hierarchical unit. Each of the plurality of processors is capable of executing a no-data transfer store command as a store command that does not require data transfer from the second storage hierarchical unit to the corresponding first storage hierarchical unit, and each of the plurality of first storage hierarchical units outputs a transfer-control signal in response to occurrence of a cache miss hit when executing the no-data transfer store command by the corresponding processor.

14 Claims, 9 Drawing Sheets

CACHE MEMORY SYSTEM, DATA PROCESSING APPARATUS, AND STORAGE APPARATUS

CROSS-REFERENCE TO RELATED APPLICATIONS

This application is based upon and claims the benefit of priority from the prior Japanese Patent Application No. 2008-66067 filed on Mar. 14, 2008, the entire contents of which are incorporated herein by reference.

BACKGROUND

1. Field

The present invention relates to a cache memory system, a data processing apparatus, and a storage apparatus, and method thereof.

2. Description of the Related Art

In a data processing apparatus, since an access latency from a processor to a main storage apparatus includes many stall cycles, a cache memory which can be accessed speedily by the processor is often provided in order to reduce the penalty associated with access from the processor to the main storage apparatus. However, when a command associated with access to a storage area where no copy of data of the main storage apparatus exists in the cache memory is executed by the processor, a cache miss hit occurs. At that time, when a load command is executed or a store command is executed in the cache memory having a write-allocating system, since an operation (move-in operation) for preparing a copy of data of the main storage apparatus in the cache memory is required, a penalty for executing a command of the processor will be caused to a certain degree.

Although occurrence frequency of the cache miss hit can be reduced by increasing capacity of the cache memory, it is not easy to increase capacity of a memory which can be accessed speedily by the processor due to trade-off between operating frequency and cost. Therefore, a method is often used for reducing the penalty associated with occurrence of the cache miss hit by providing a primary cache memory which can be accessed in the same operating speed as that of the processor and a high-capacity secondary cache memory which cannot be accessed in the same operating speed as that of the processor but can be accessed more speedily than the main storage apparatus (that is, by providing a hierarchical structure in the cache memory). In the case where a hierarchical cache memory is used in a data processing apparatus having a multi-processor structure, a storage hierarchy which is closer to the main storage apparatus is often shared among a plurality of processors. In this case, a cache control apparatus for assuring coherency of data among the plurality of processors may be provided.

Further, when data of the corresponding entry of the cache memory is rewritten by a store command (writing store data), data transferred to the cache memory by the move-in operation is never referred to by the processor. Therefore, the move-in operation has been performed uselessly and it may cause problems in processing performance and power consumption of the data processing apparatus.

In addition, techniques related to the cache memory are disclosed in, for example, Japanese Patent No. 2552704, Japanese Patent No. 3055908, and Japanese Patent No. 2637320.

SUMMARY

According to an aspect of an embodiment of the invention, a method, apparatus, and computer readable recording media thereof is provided in which a computer processor implements a no-move-in store command as a store command that does not require a move-in and the no-move-in store command, when executed by the processor, controls not to request a move-in even if the cache miss hit occurs.

According to an aspect of an embodiment, there is provided a cache memory system including: a plurality of first storage hierarchical units provided individually to a plurality of processors; a second storage hierarchical unit provided commonly to the plurality of processors; and a control unit for controlling data transfer between the plurality of first storage hierarchical units and the second storage hierarchical unit, wherein each of the plurality of processors is capable of executing a no-data transfer store command as a store command that does not require data transfer from the second storage hierarchical unit to the corresponding first storage hierarchical unit, each of the plurality of first storage hierarchical units outputs a transfer-control signal in response to occurrence of a cache miss hit when executing the no-data transfer store command by the corresponding processor, and the control unit updates state information of a first storage hierarchical unit corresponding to a first processor included in the plurality of processors without performing data transfer at least from the second storage hierarchical unit to the first storage hierarchical unit corresponding to the first processor with respect to a storage area designated by the first storage hierarchical unit corresponding to the first processor in the case where the transfer-control signal is output by the first storage hierarchical unit corresponding to the first processor.

Other aspects and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION OF THE PREFERRED EMBODIMENTS

Figure 1:
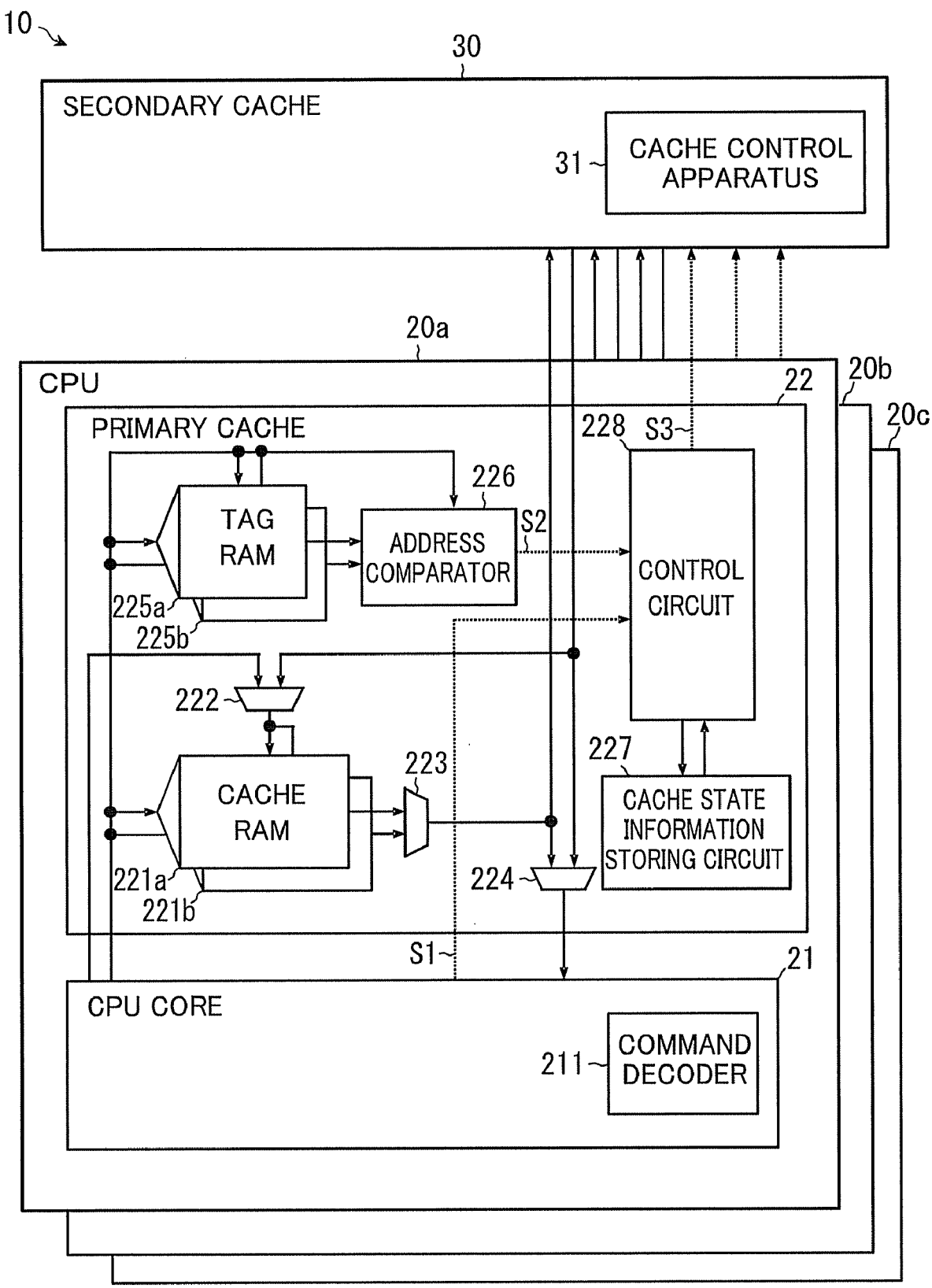
FIG. 1 is a diagram representing an embodiment of the present invention.

Hereinbelow, a preferred embodiment will be described in accordance with the accompanying drawings wherein like numerals refer to like parts throughout. FIG. 1 represents an embodiment. A data processing apparatus 10 according to the embodiment has Central Processing Units (CPU) 20a, 20b and 20c (having a CPU core 21 and a primary cache 22), and a secondary cache 30 (having a cache control apparatus 31) shared by the CPUs 20a, 20b and 20c. The secondary cache 30 is connected to a main storage apparatus, though it is not represented in the drawing.

The CPU core 21 has a command decoder 211 and can execute a no-move-in store command as a store command which does not require move-in (transferring data from the secondary cache 30 to the primary cache 22) in addition to various known commands. When the CPU core 21 executes the no-move-in store command, the CPU core 21 outputs a move-in prohibition signal S1 (signal representing that move-in is not required) to the primary cache 22.

The primary cache 22 has cache Random Access Memories (RAM) 221a and 221b, selectors 222, 223 and 224, tag RAMs 225a and 225b, an address comparator 226, a cache state information storing circuit 227, and a control circuit 228. For example, in the primary cache 22, a write-allocating system is used. In addition, in the primary cache 22, the MOSI cache coherency protocol/system is used for assuring a cache coherency.

The cache RAMs 221a and 221b write output data of the selector 222 into an entry depending on an output address of the CPU core 21 according to writing instructions of the control circuit 228. Further, the cache RAMs 221a and 221b read data from the entry depending on the output address of the CPU core 21 according to reading instructions of the control circuit 228 and output the read data to the selector 223. The selector 222 selects output data of the CPU core 21 or output data of the secondary cache 30 according to selecting instructions of the control circuit 228 and outputs the selected output data to the cache RAMs 221a and 221b. The selector 223 selects output data of the cache RAM 221a or output data of the cache RAM 221b according to selecting instructions of the control circuit 228 and outputs the selected output data to the selector 224 and the secondary cache 30. The selector 224 selects output data of the selector 223 or output data of the secondary cache 30 according to selecting instructions of the control circuit 228 and outputs the selected output data to the CPU core 21.

The tag RAMs 225a and 225b write a part of an address into the entry depending on the output address of the CPU core 21 according to writing instructions of the control circuit 228. The tag RAMs 225a and 225b read the address from the entry depending on the output address of the CPU core 21 according to reading instructions of the control circuit 228 and output the read address to the address comparator 226. The address comparator 226 compares a part of the output address of the CPU core 21 with the output address of the tag RAMs 225a and 225b and outputs an address comparing result signal S2 (signal representing whether the addresses match or not) to the control circuit 228. The cache state information storing circuit 227 stores state information of each entry which is embodied by a register or the like and is used for controlling cache coherency. The state information is set to any one of a modified (M) state, an owned (O) state, a shared (S) state and an invalid (I) state by the control circuit 228.

The control circuit 228 performs various operations for controlling the entire primary cache 22. The control circuit 228 determines a cache hit/cache miss hit based on the address comparing result signal S2. When the control circuit 228 recognizes occurrence of the cache miss hit, upon output of the move-in prohibition signal S1 by the CPU core 21, a no-move-in store request signal S3 (signal representing that a cache miss hit occurs when executing a no-move-in store command) is output to the secondary cache 30 (cache control apparatus 31). The cache control apparatus 31 performs an operation for controlling data transfer between the primary cache 22 (control circuit 228) of the CPUs 20a, 20b and 20c and the secondary cache 30, an operation for assuring the cache coherency or the like.

Various control signals such as a move-in request signal (signal for requesting data transfer from the secondary cache 30 to the primary cache 22) are output from the primary cache 22 (control circuit 228) of the CPUs 20a, 20b and 20c to the secondary cache 30 (cache control apparatus 31) when necessary, though it is not represented in the drawing. Further, various control signals such as a flush request signal (signal for requesting to write back dirty data) or an invalidate request signal (signal for requesting to set the state information to the invalid state) are output from the secondary cache 30 (cache control apparatus 31) to the primary cache 22 (control circuit 228) of the CPUs 20a, 20b and 20c when necessary.

Figure 2A:
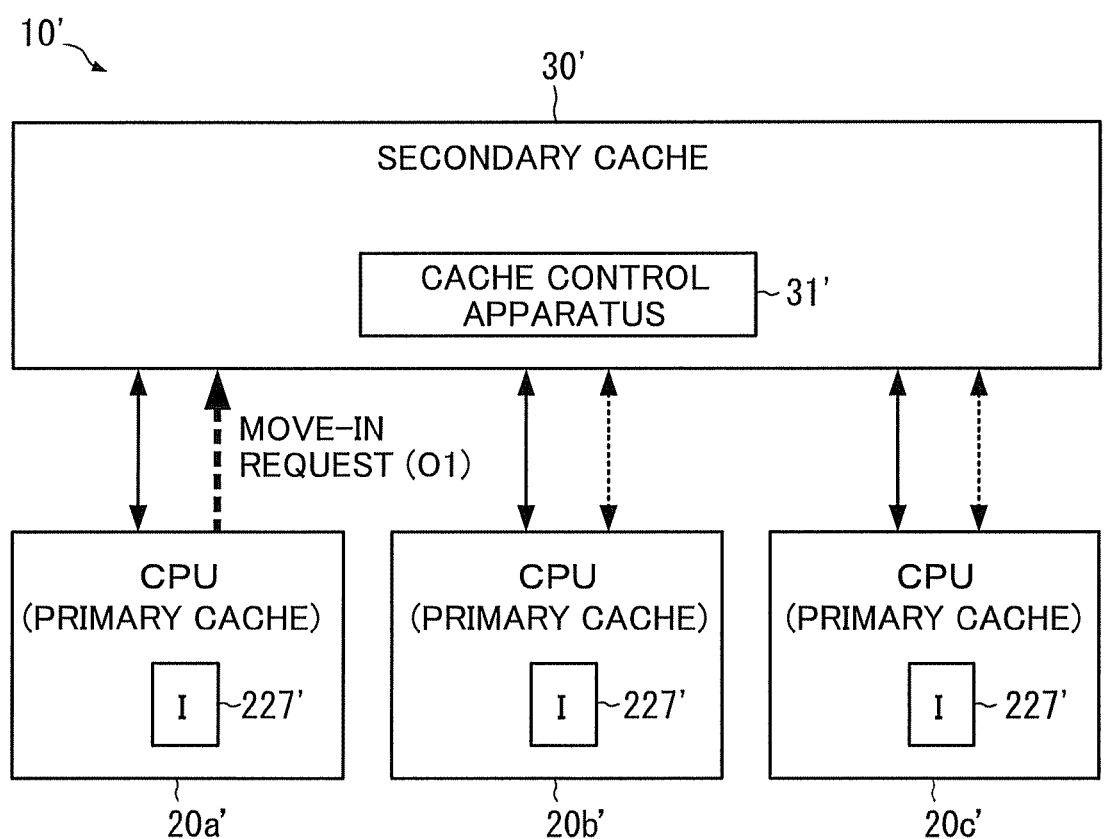
FIGS. 2A and 2B are diagrams representing an operation of a conventional data processing apparatus.
Figure 2B:
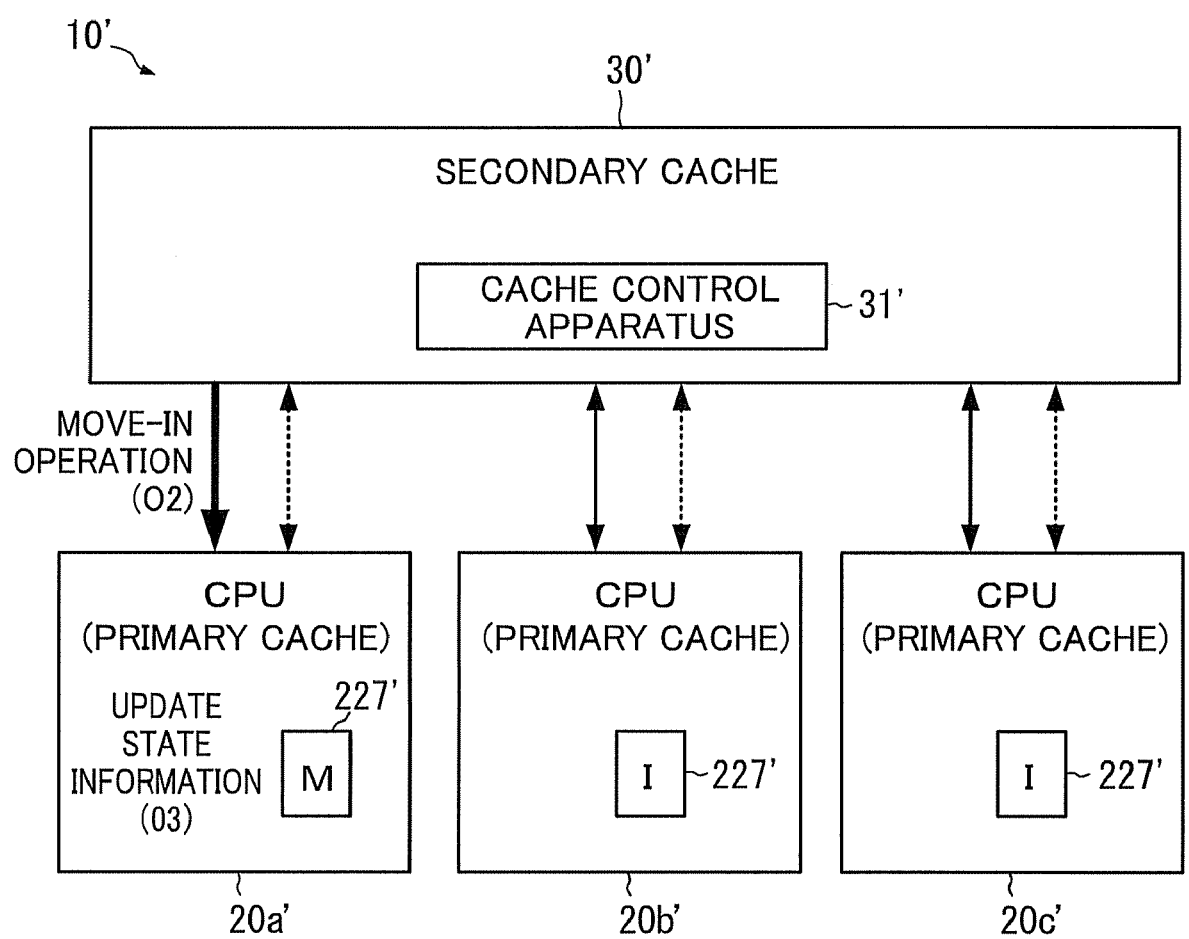

FIGS. 2A and 2B represent an operation of a conventional data processing apparatus. The conventional data processing apparatus 10' has CPUs 20a', 20b' and 20c' and a secondary cache 30'. The CPUs 20a', 20b' and 20c' are the same as the CPUs 20a, 20b and 20c represented in FIG. 1 except that the CPUs 20a', 20b' and 20c' do not have a mechanism related to the no-move-in store command. The secondary cache 30' is the same as the secondary cache 30 represented in FIG. 1 except that the secondary cache 30' does not have a mechanism related to the no-move-in store request signal.

The operations represented in FIGS. 2A and 2B are performed when a cache miss hit occurs upon executing a store command for designating an address A as a store destination address at the CPU 20a' (primary cache) in the case where line data corresponding to the address A does not exist in the modified cache state in the CPUs 20b' or 20c' (primary cache). In addition, it is previously known that the line data corresponding to the address A is never referred to at the CPU 20a'.

When the cache miss hit occurs, upon executing the store command for designating the address A as a store destination address at the CPU 20a', as represented in FIG. 2A, a move-in request signal is output from the CPU 20a' to the secondary cache 30' (cache control apparatus 31') (O1). With this operation, as represented in FIG. 2B, data of the corresponding line (line corresponding to the address A designated by the CPU 20a') is transferred from the secondary cache 30' to the CPU 20a' by the move-in operation (O2). At the CPU 20a' (primary cache), after the data transferred from the secondary cache 30' is written in the corresponding entry, the execution of the store command is completed by writing the store data into the corresponding entry. Thereafter, the state information of the corresponding entry of the cache state information storing circuit 227' is updated from "I" to "M" (O3). Since there is the circumstance when data transferred from the secondary cache 30' to the CPU 20a' by the move-in operation is never referred to at the CPU 20a', data transfer (move-in) from the secondary cache 30' to the CPU 20a' is uselessly performed.

Figure 3A:
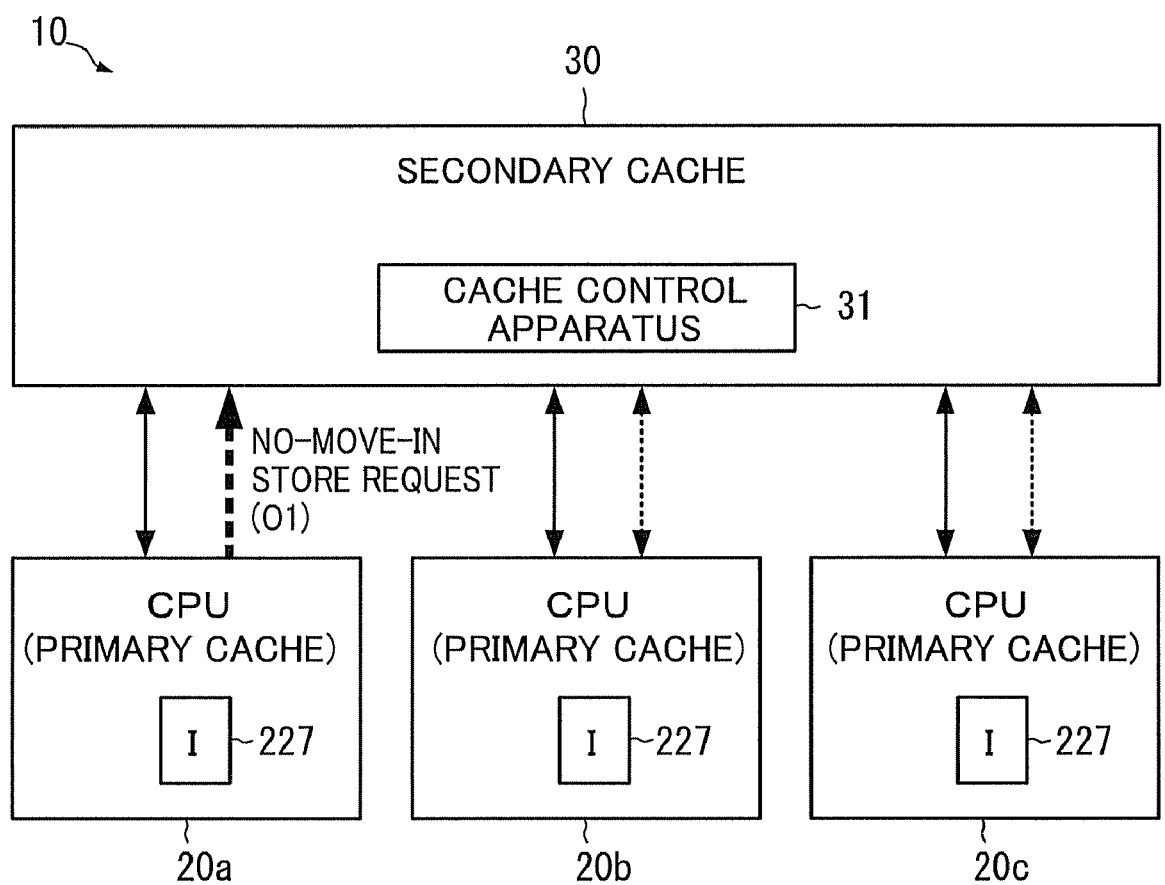
FIGS. 3A and 3B are diagrams representing an operation of the data processing apparatus represented in FIG. 1.
Figure 3B:
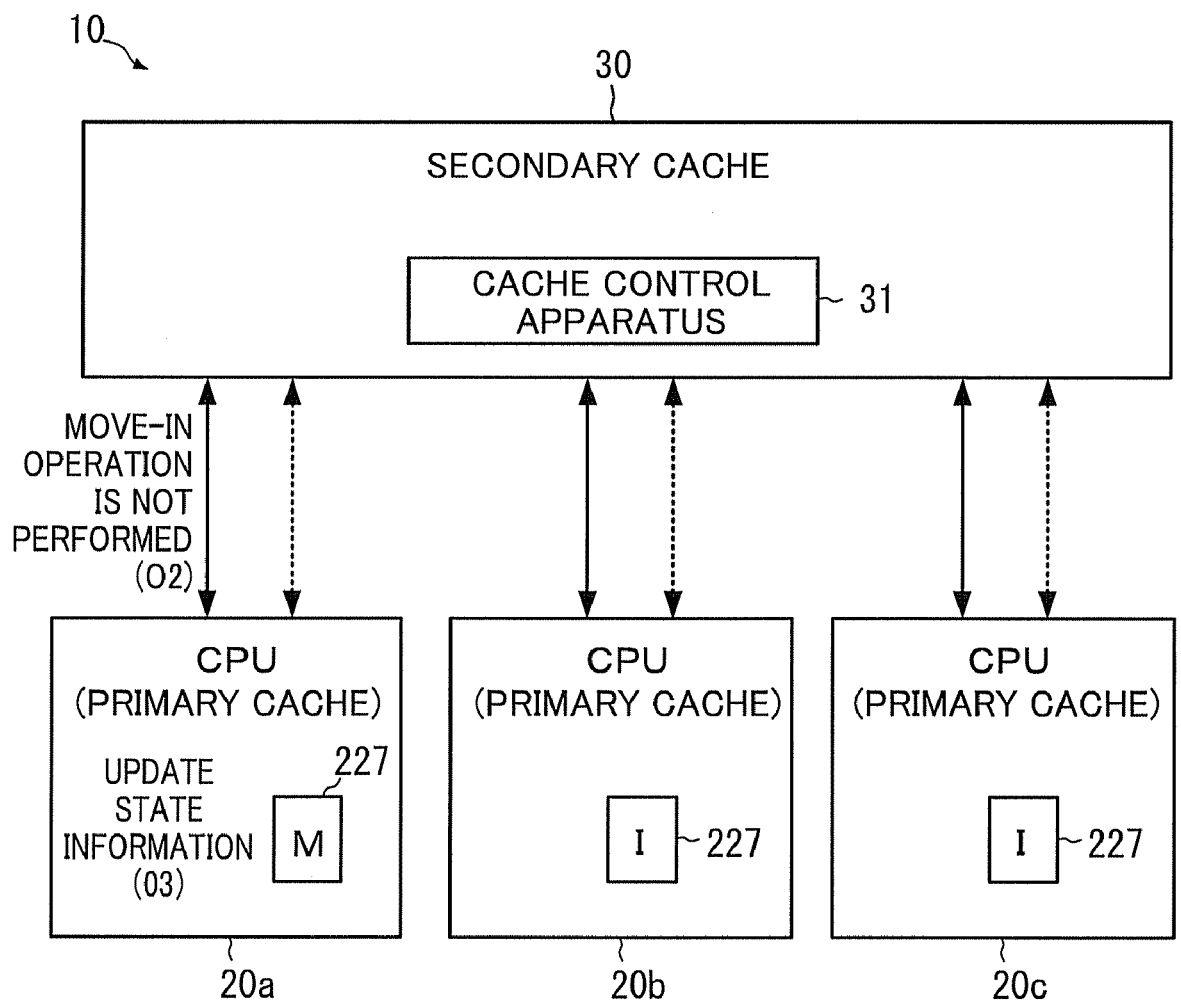

FIGS. 3A and 3B represent operations of the data processing apparatus represented in FIG. 1. The operations represented in FIGS. 3A and 3B are performed when a cache miss hit occurs and executing a no-move-in store command for designating an address A as a store destination address at the CPU 20a (primary cache) in the case where line data corresponding to the address A does not exist in the modified cache state in the CPUs 20b or 20c (primary cache). In addition, it is previously known that the line data corresponding to the address A is never referred to at the CPU 20a.

When the cache miss hit occurs, upon executing the no-move-in store command for designating the address A as a store destination address at the CPU 20a, as represented in FIG. 3A, not a move-in request signal but a no-move-in store request signal is output from the CPU 20a to the secondary cache 30 (cache control apparatus 31) (O1). With this operation, as represented in FIG. 3B, the move-in operation is not performed (O2), but only an operation related to assuring cache coherency is performed in the cache control apparatus 31 of the secondary cache 30. At the CPU 20a, upon outputting the no-move-in store request signal, the CPU 20a completes execution of the store command by writing (i.e., directly writing) the store data into the corresponding primary cache 22 entry. Thereafter, the state information of the corresponding entry of the cache state information storing circuit 227 is updated from "I" to "M" (O3). As described above, the data processing apparatus 10 represented in FIG. 1 differs from the conventional data processing apparatus 10' (represented in FIGS. 2A and 2B), so that useless data transfer from the secondary cache 30 to the CPU 20a associated with the move-in operation is avoided and data coherency among the CPUs 20a, 20b and 20c is assured.

Figure 4A:
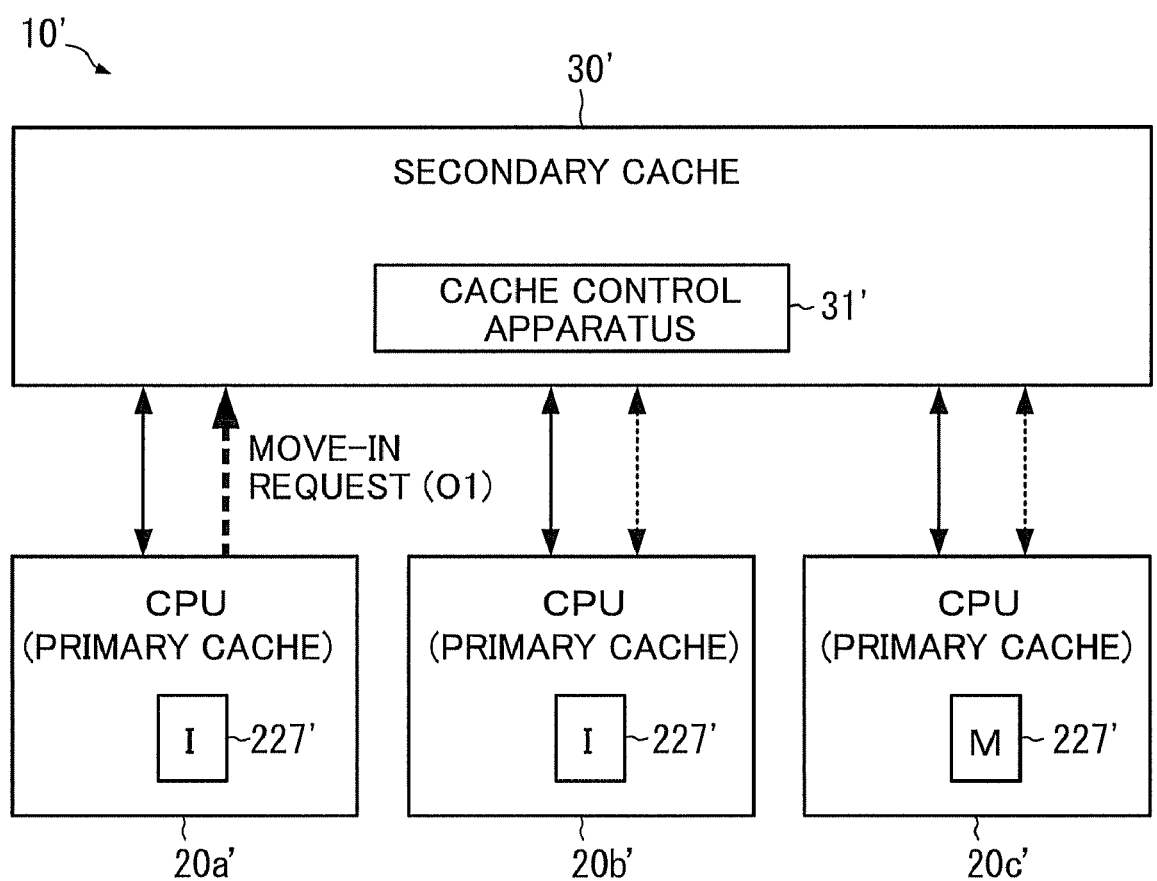
FIGS. 4A and 4B are diagrams representing another operation of the conventional data processing apparatus.
Figure 4B:
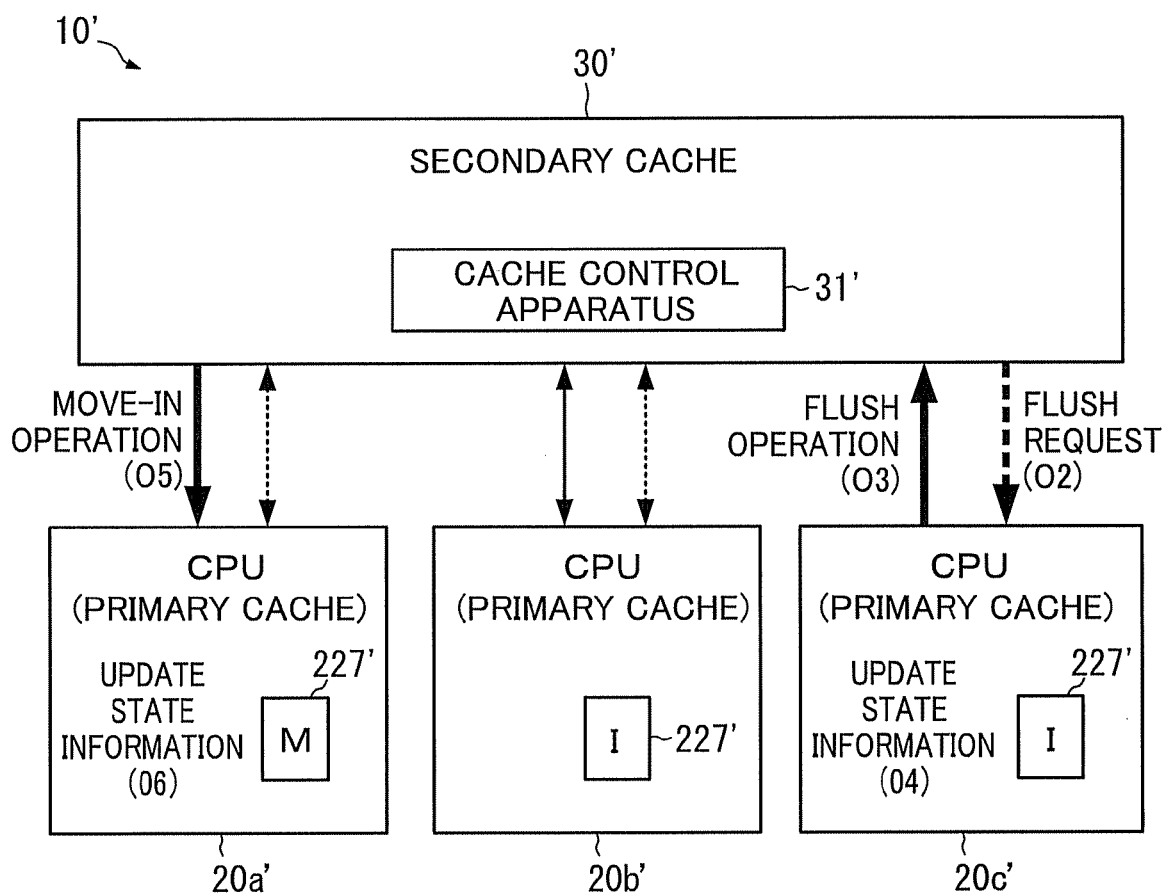

FIGS. 4A and 4B represent another operation of the conventional data processing apparatus. The operations represented in FIGS. 4A and 4B are performed when a cache miss hit occurs and executing a store command for designating an address A as a store destination address at the CPU 20a' (primary cache) in the case where line data corresponding to the address A exists in the modified cache state in the CPU 20c' (primary cache). In addition, it is previously known that the line data corresponding to the address A is never referred to at the CPU 20a'.

When the cache miss hit occurs, upon executing the store command for designating the address A as a store destination address at the CPU 20a', as represented in FIG. 4A, a move-in request signal is output from the CPU 20a' to the secondary cache 30' (cache control apparatus 31') (O1). With this operation, as represented in FIG. 4B, a flush request signal is output from the secondary cache 30' (cache control apparatus 31') to the CPU 20c' (O2). Therefore, dirty data of the corresponding line is transferred from the CPU 20c' to the secondary cache 30' by the flush operation (O3), and at the CPU 20c', the state information of the corresponding entry of the cache state information storing circuit 227' is updated from "M" to "I" (O4). Thereafter, data transferred from the CPU 20c' to the secondary cache 30' is transferred from the secondary cache 30' to the CPU 20a' by a move-in operation (O5). At the CPU 20a' (primary cache), after data transferred from the secondary cache 30' is written into the corresponding entry, the execution of the store command is completed by writing store data into the corresponding entry and the state information of the corresponding entry of the cache state information storing circuit 227' is updated from "I" to "M" (O6). Since data transferred from the secondary cache 30' to the CPU 20a' by the move-in operation is never referred to at the CPU 20a', data transfer (flush) from the CPU 20c' to the secondary cache 30' and data transfer (move-in) from the secondary cache 30' to the CPU 20a' are uselessly performed.

Figure 5A:
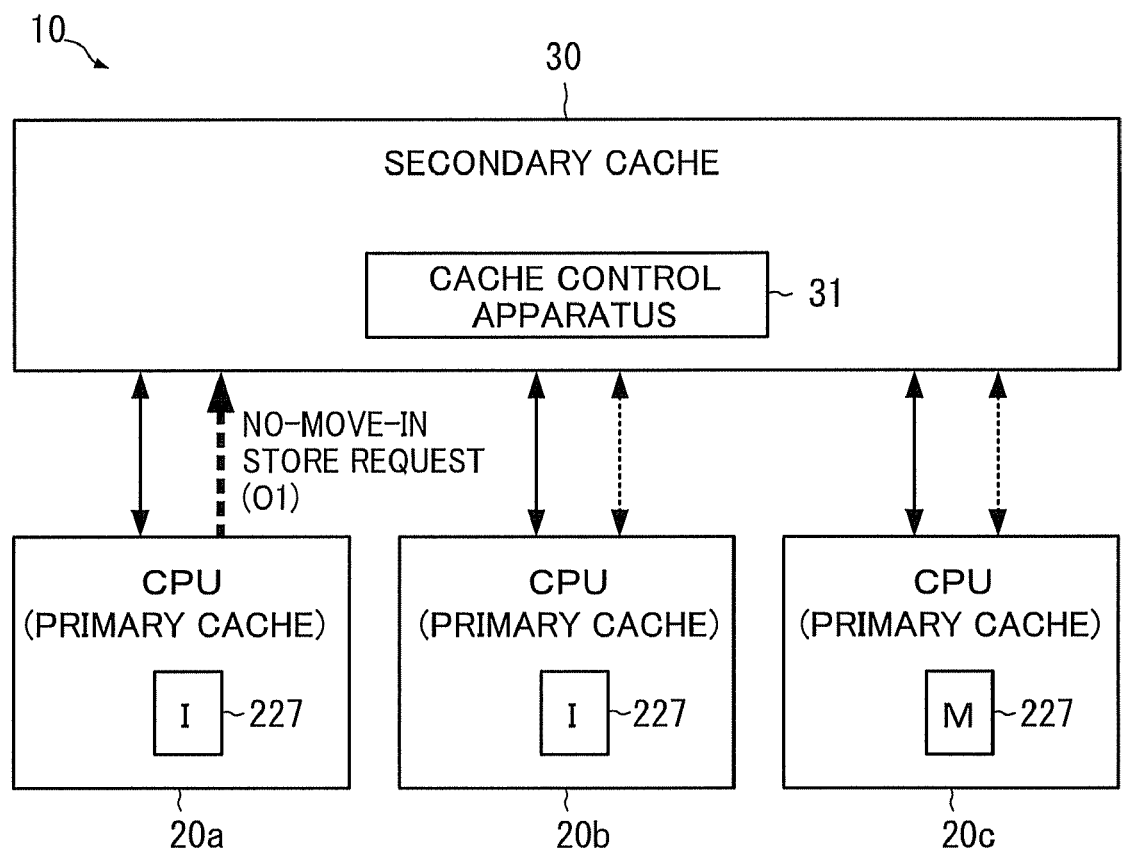
FIGS. 5A and 5B are diagrams representing another operation of the data processing apparatus represented in FIG. 1.
Figure 5B:
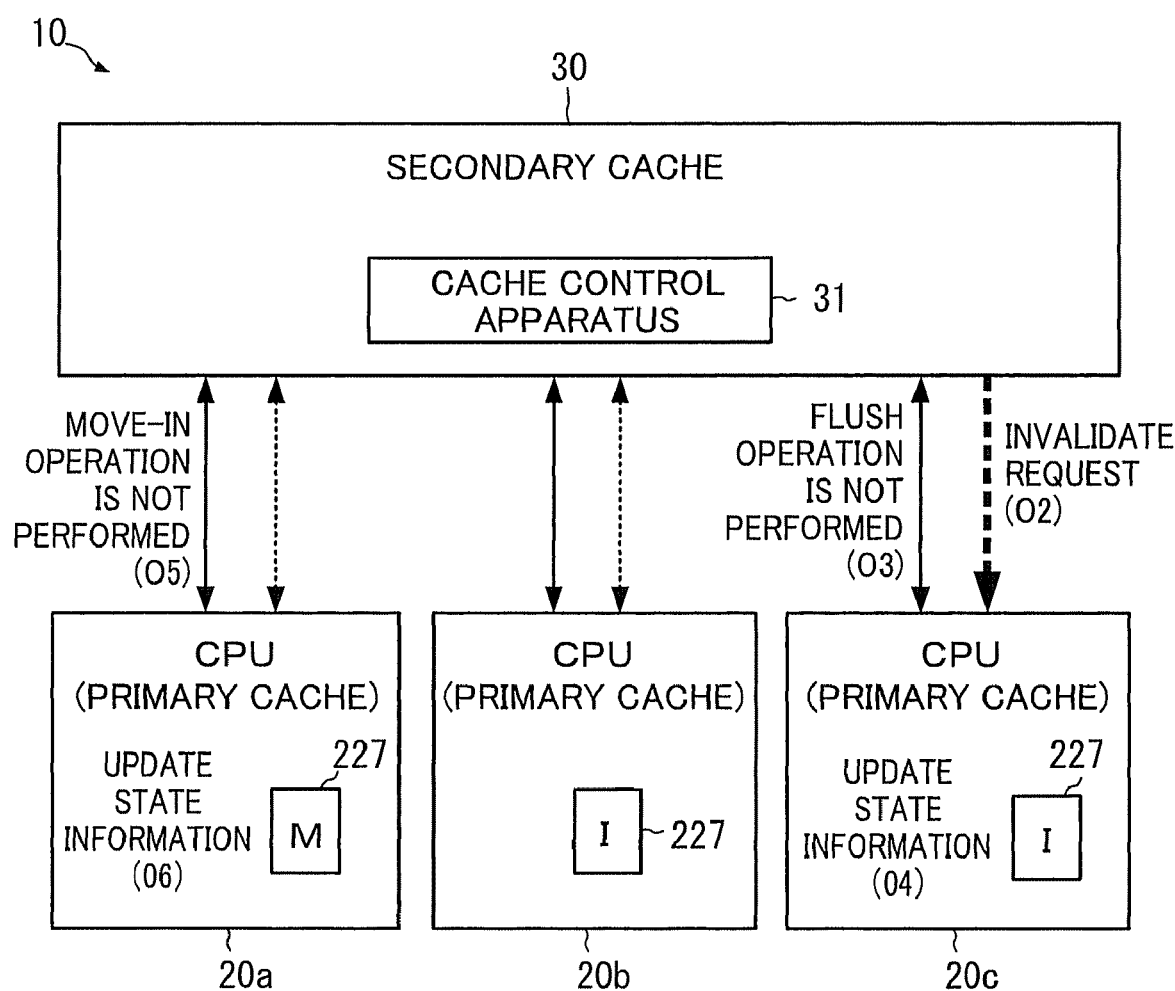

FIGS. 5A and 5B represent another operation of the data processing apparatus represented in FIG. 1. The operations represented in FIGS. 5A and 5B are performed when a cache miss hit occurs and executing a no-move-in store command for designating an address A as a store destination address at the CPU 20a (primary cache) in the case where line data corresponding to the address A exists in the modified cache state in the CPU 20c (primary cache). In addition, it is previously known that the line data corresponding to the address A is never referred to at the CPU 20a.

When the cache miss hit occurs, upon executing the no-move-in store command for designating the address A as a store destination address at the CPU 20a, as represented in FIG. 5A, not a move-in request signal but a no-move-in store request signal is output from the CPU 20a to the secondary cache 30 (cache control apparatus 31) (O1). With this operation, as represented in FIG. 5B, not a flush request signal but an invalidate request signal is output from the secondary cache 30 (cache control apparatus 31) to the CPU 20c (O2). Therefore, the flush operation is not performed (O3), and at the CPU 20c, the state information of the corresponding entry of the cache state storing circuit 227 is updated from "M" to "I" (O4). Further, a move-in operation is not performed (O5), and at the CPU 20a, upon outputting the no-move-in store request signal, the CPU 20a completes execution of the store command by writing (i.e., directly writing) the store data into the corresponding primary cache 22 entry. Thereafter, the state information of the corresponding entry of the cache state information storing circuit 227 is updated from "I" to "M" (O6). As described above, the data processing apparatus 10 represented in FIG. 1 differs from the conventional data processing apparatus 10' (represented in FIGS. 4A and 4B), so that useless data transfer from the CPU 20c to the secondary cache 30 associated with the flush operation and useless data transfer from the secondary cache 30 to the CPU 20a associated with the move-in operation are avoided and data coherency among the CPUs 20a, 20b and 20c is assured.

As described above, the data processing apparatus 10 according to the embodiment can reduce useless data transfer (memory access) between the primary cache 22 of the CPUs 20a, 20b and 20c and the secondary cache 30 with/while assuring cache coherency. This will substantially contribute to improvement of the processing performance and reduction of the power consumption in the data processing apparatus 10.

According to an aspect of the embodiments of the invention, any combinations of the described features, functions, operations, and/or benefits can be provided. The embodiments can be implemented as an apparatus (machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the data processing apparatus 10) comprises a controller (CPU) (e.g., a hardware logic circuitry based computer processor that processes or executes instructions, namely software/program), computer readable recording media (e.g., primary/secondary caches 30, 22, main storage apparatus, etc.), transmission communication media interface (network interface), and/or a display device, all in communication through a data communication bus. The results produced can be displayed on a display of the computing apparatus. A program/software implementing the embodiments may be recorded on computer readable media comprising computer-readable recording media, such as in non-limiting examples, a semiconductor memory (for example, RAM, ROM, etc.).

While the present invention has been described in detail, it is to be understood that the foregoing embodiment is only an exemplary embodiment. The present invention is not limited to the above embodiment and various changes/modifications and equivalents can be made within the spirit and scope of the present invention.

What is claimed is:

1. A cache memory system comprising:
   a plurality of first storage hierarchical units provided individually to a plurality of processors;
   a second storage hierarchical unit provided commonly to the plurality of processors; and
   a control unit controlling data transfer between the plurality of first storage hierarchical units and the second storage hierarchical unit,
   wherein each of the plurality of processors is capable of executing a no-data transfer store command as a store command that does not require data transfer from the second storage hierarchical unit to a corresponding first storage hierarchical unit, each of the plurality of first storage hierarchical units outputs a transfer-control signal when executing the no-data transfer store command output by a corresponding processor of a first storage hierarchical unit and a cache miss hit occurs indicating that the first storage hierarchical unit of the corresponding processor does not have data designated by the no-data transfer store command, and the control unit updates state information of a first storage hierarchical unit corresponding to a first processor from among the plurality of processors without performing data transfer at least from the second storage hierarchical unit to the first storage hierarchical unit corresponding to the first processor with respect to a storage area designated by the first storage hierarchical unit corresponding to the first processor, in case where the transfer-control signal is output by the first storage hierarchical unit corresponding to the first processor.

2. The cache memory system according to claim 1, wherein the control unit updates the state information of the first storage hierarchical unit corresponding to the first processor without performing data transfer from the second storage hierarchical unit to the first storage hierarchical unit corresponding to the first processor in the case where the transfer-control signal is output by the first storage hierarchical unit corresponding to the first processor and data of the storage area designated by the first storage hierarchical unit corresponding to the first processor does not exist in a modified state in any of the first storage hierarchical units except the first storage hierarchical unit corresponding to the first processor.

3. The cache memory system according to claim 2, wherein the control unit updates the state information of the first storage hierarchical unit corresponding to the first processor from an invalid state to a modified state.

4. The cache memory system according to claim 1, wherein the control unit updates state information of a first storage hierarchical unit corresponding to a second processor which is a processor other than the first processor without performing data transfer from the first storage hierarchical unit corresponding to the second processor to the second storage hierarchical unit and updates the state information of the first storage hierarchical unit corresponding to the first processor without performing data transfer from the second storage hierarchical unit to the first storage hierarchical unit corresponding to the first processor, in case where the transfer-control signal is output by the first storage hierarchical unit corresponding to the first processor and data of the storage area designated by the first storage hierarchical unit corresponding to the first processor exists in a modified state in the first storage hierarchical unit corresponding to the second processor.

5. The cache memory system according to claim 4, wherein the control unit updates the state information of the first storage hierarchical unit corresponding to the second processor from the modified state to the invalid state and updates the state information of the first storage hierarchical unit corresponding to the first processor from the invalid state to the modified state.

6. The cache memory system according to claim 1, wherein each of the plurality of first storage hierarchical units uses a write-allocating system.

7. The cache memory system according to claim 1, wherein each of the plurality of first storage hierarchical units is provided in a corresponding processor and the second storage hierarchical unit is provided outside the plurality of processors.

8. A data processing apparatus using a plurality of processors comprising:
a plurality of first storage hierarchical units provided individually to the plurality of processors;
a second storage hierarchical unit provided commonly to the plurality of processors; and
a control unit controlling data transfer between the plurality of first storage hierarchical units and the second storage hierarchical unit,
wherein each of the plurality of processors is capable of executing a no-data transfer store command as a store command that does not require data transfer from the second storage hierarchical unit to a corresponding first storage hierarchical unit,
each of the plurality of first storage hierarchical units outputs a transfer-control signal when executing the no-data transfer store command by a corresponding processor of a first storage hierarchical unit and a cache miss hit occurs indicating that the first storage hierarchical unit of the corresponding processor does not have data designated by the no-data transfer store command, and
the control unit updates state information of a first storage hierarchical unit corresponding to a first processor from among the plurality of processors without performing data transfer at least from the second storage hierarchical unit to the first storage hierarchical unit corresponding to the first processor with respect to a storage area designated by the first storage hierarchical unit corresponding to the first processor, in case where the transfer-control signal is output by the first storage hierarchical unit corresponding to the first processor.

9. The data processing apparatus according to claim 8, wherein the control unit updates the state information of the first storage hierarchical unit corresponding to the first processor without performing data transfer from the second storage hierarchical unit to the first storage hierarchical unit corresponding to the first processor in the case where the transfer-control signal is output by the first storage hierarchical unit corresponding to the first processor and data of the storage area designated by the first storage hierarchical unit corresponding to the first processor does not exist in a modified state in any of the first storage hierarchical units except the first storage hierarchical unit corresponding to the first processor.

10. The data processing apparatus according to claim 8, wherein the control unit updates state information of a first storage hierarchical unit corresponding to a second processor which is a processor other than the first processor without performing data transfer from the first storage hierarchical unit corresponding to the second processor to the second storage hierarchical unit and updates the state information of the first storage hierarchical unit corresponding to the first processor without performing data transfer from the second storage hierarchical unit to the first storage hierarchical unit corresponding to the first processor, in case where the transfer-control signal is output by the first storage hierarchical unit corresponding to the first processor and data of the storage area designated by the first storage hierarchical unit corresponding to the first processor exists in a modified state in the first storage hierarchical unit corresponding to the second processor.

11. The data processing apparatus according to claim 8, wherein each of the plurality of first storage hierarchical units is provided in a corresponding processor and the second storage hierarchical unit is provided outside the plurality of processors.

12. A storage apparatus used as a cache memory in a processor which is capable of executing a no-data transfer store command as a store command that does not require data transfer from other cache storage apparatus to the cache memory, the storage apparatus comprising:
- a cache controller outputting a transfer-control signal to the other cache storage apparatus when receiving the no-data transfer store command output by the processor and a cache miss hit occurs indicating that the storage apparatus does not have data designated by the no-data transfer store command,
- wherein the transfer-control signal stops the data transfer from the other cache storage apparatus.

13. A method of managing coherency of cache data, comprising:
- storing the cache data in a plurality of first storage hierarchical units to a plurality of processors;
- storing the cache data in a second storage hierarchical unit provided commonly to the plurality of processors;
- executing by each processor a no-data transfer store command as a store command that does not require data transfer from the second storage hierarchical unit to a corresponding first storage hierarchical unit,
- outputting by each first storage hierarchical unit a transfer-control signal when a corresponding processor executes the no-data transfer store command output by the corresponding processor and a cache miss hit occurs indicating that the storage apparatus does not have data designated by the no-data transfer store command, and
- controlling data transfer between the plurality of first storage hierarchical units and the second storage hierarchical unit by updating state information of a first storage hierarchical unit corresponding to a first processor from among the plurality of processors without performing data transfer at least from the second storage hierarchical unit to the first storage hierarchical unit corresponding to the first processor with respect to a storage area designated by the first storage hierarchical unit corresponding to the first processor, if the transfer-control signal is output by the first storage hierarchical unit corresponding to the first processor.

14. The method according to claim 13, wherein the updating of the state information of the first storage hierarchical unit comprises completing by the first processor execution of the store command by directly writing the store data into the first storage hierarchical unit.

* * * * *